(12) United States Patent
Dixon

(10) Patent No.: US 6,279,607 B1
(45) Date of Patent: Aug. 28, 2001

(54) FLUID METERING VALVE

(75) Inventor: Glyn E Dixon, Cheltenham (GB)

(73) Assignee: Lucas Industries Limited (GB)

( * ) Notice: Subject to any disclaimer, the term of this patent is extended or adjusted under 35 U.S.C. 154(b) by 0 days.

(21) Appl. No.: 09/607,241

(22) Filed: Jun. 30, 2000

(30) Foreign Application Priority Data

Jul. 8, 1999 (GB) .................................................. 9916013

(51) Int. Cl.⁷ ........................... F16K 37/00; F16K 11/078
(52) U.S. Cl. ................... 137/552; 137/554; 137/625.17; 137/636.4
(58) Field of Search ............................. 137/625.17, 552, 137/554, 636.4; 251/129.04

(56) References Cited

U.S. PATENT DOCUMENTS

| 48,588 | * | 7/1865 | Poh ............................. 137/625.17 X |
| 313,089 | * | 3/1885 | Martin ......................... 137/625.17 X |
| 2,202,216 | * | 5/1940 | Madsen ....................... 137/625.17 X |
| 3,349,798 | * | 10/1967 | Allen ............................ 137/625.17 |
| 4,191,213 | * | 3/1980 | Dolling et al. .............. 137/625.17 |
| 4,974,636 | * | 12/1990 | Cogger ........................ 137/625.17 |
| 5,358,213 | * | 10/1994 | Pilolla ......................... 137/625.17 X |
| 5,524,822 | * | 6/1996 | Simmons .................... 137/625.17 X |
| 5,595,216 | * | 1/1997 | Pilolla ......................... 137/625.17 X |
| 5,755,262 | * | 5/1998 | Pilolla ......................... 137/625.17 |
| 6,158,465 | * | 12/2000 | Lambert et al. ............ 137/625.17 X |

* cited by examiner

Primary Examiner—John Rivell
(74) Attorney, Agent, or Firm—Andrus, Sceales, Starke & Sawall

(57) ABSTRACT

A fluid metering valve, for example as shown in FIG. 1, comprises a valve element moveable, axially and angularly, by a drive member, a sensor arranged to monitor the position occupied by a target carried by the drive member, and an adjustment arrangement whereby the axial position of the target can be adjusted relative to the drive member independently of the angular position of the target. A backlash free connection may be provided between the valve element and the drive member, the backlash free connection comprising a projection protruding laterally from one of the drive member and the valve element, the projection being received within a recess associated with the other of the drive member and the valve element, the dimensions of the projection and the recess being such that the projection engages the sides of the recess but is spaced from the base thereof, and biasing means urging the projection towards the base of the recess.

13 Claims, 3 Drawing Sheets

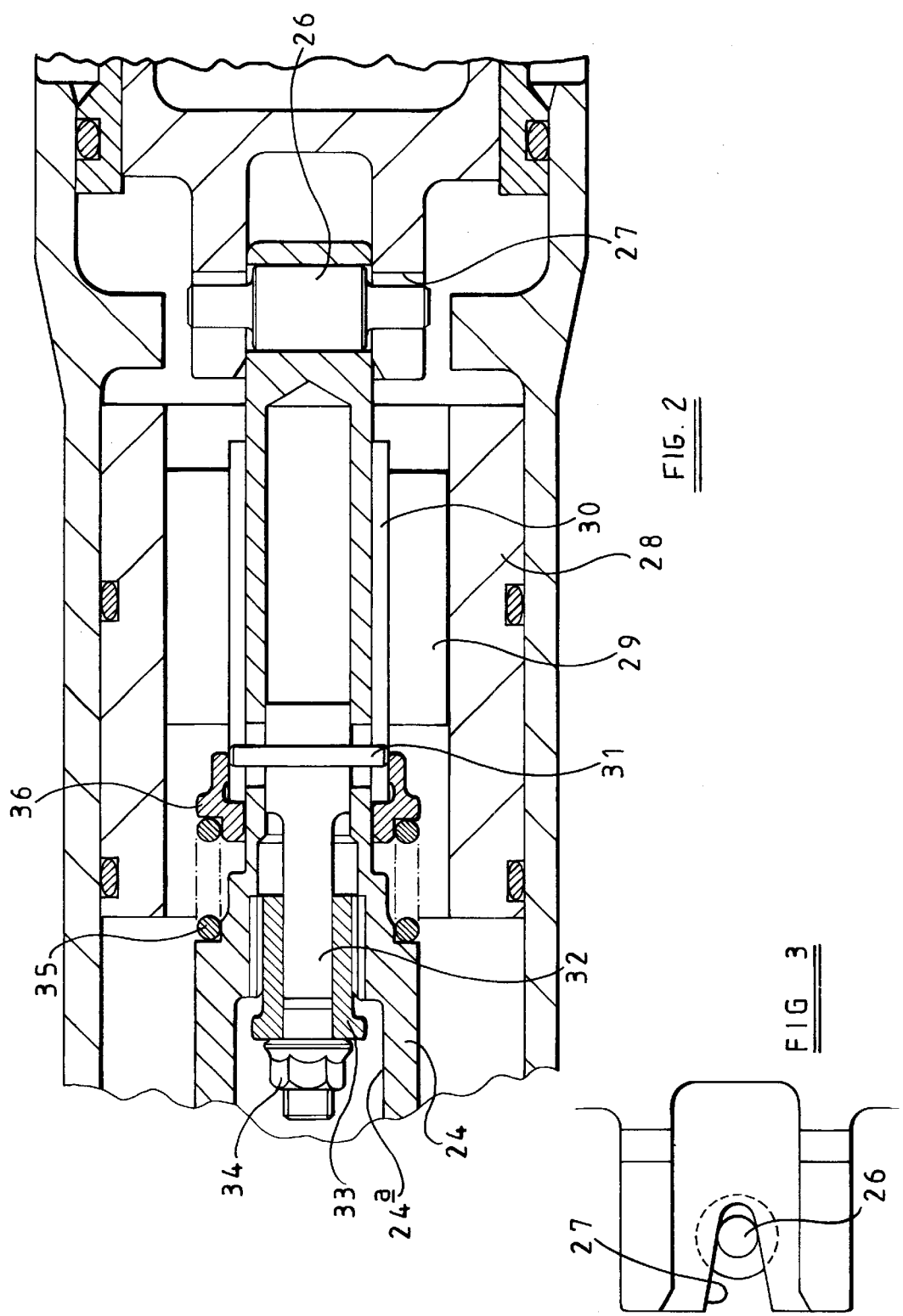

FLUID METERING VALVE

This invention relates to a fluid metering valve, and in particular to a valve of the type in which the fluid flow rate is controlled by adjusting the axial and angular position of a valve element.

In order to provide accurate control over the output flow rate of such a valve, it is important to ensure that the valve element is connected to a drive arrangement used to control the axial and angular positions of the valve element in a backlash free manner such that no movement of the valve element relative to an output of the drive arrangement is permitted. It is an object of the invention to provide a fluid metering valve having such a backlash free connection in a simple and convenient form.

It is also desirable to be able to monitor the position of the valve element. This may be achieved by providing a sensor which monitors the position of a target associated with the drive member. The axial and angular positions of the target are conveniently adjustable.

According to an aspect of the invention there is provided a fluid metering valve comprising a valve element moveable, axially and angularly, by a drive member, a sensor arranged to monitor the position occupied by a target carried by the drive member, and an adjustment arrangement whereby the axial position of the target can be adjusted relative to the drive member independently of the angular position of the target.

Such an arrangement is advantageous in that a datum position for the target can be selected and set relatively easily.

The target is preferably carried by a carrier member which is keyed to an angular adjustment member, the angular adjustment member being in screw-threaded engagement with the drive member. The carrier member is slidable axially relative to the angular adjustment member, and axial adjustment means are conveniently provided to permit adjustment of the axial position of the carrier member relative to the angular adjustment member. In use, the angular position of the target is set by angular movement of the angular adjustment member. Once the correct angular position has been achieved, the axial position of the target is set using the axial adjustment means.

A spring is preferably provided between the drive member and the target such that the mounting of the target to the drive member is substantially backlash free.

The valve is conveniently of the type having two outlet ports, wherein the fluid flow rates to the two outlet ports can be controlled independently of one another by appropriate control of the angular and axial position of the valve element.

According to another aspect of the present invention there is provided a fluid metering valve comprising a valve element which is moveable axially and angularly, a drive member whereby axial and angular movements are transmitted to the valve element, and a backlash free connection between the valve element and the drive member, the backlash free connection comprising a projection protruding laterally from one of the drive member and the valve element, the projection being received within a recess associated with the other of the drive member and the valve element, the dimensions of the projection and the recess being such that the projection engages the sides of the recess but is spaced from the base thereof, and biasing means urging the projection towards the base of the recess.

As the projection does not engage the base of the recess, engaging only the sides of the recess, and as the valve element and the drive member are biased in such a manner as to urge the projection towards the base of the recess, the cooperation between the projection and the sides of the recess substantially prevents relative axial and angular movement between the valve element and the drive member.

The projection may be defined by an end region of a pin. The pin conveniently extends through an opening formed in the drive member and engages with a recess formed in the valve element, an opposite end of the pin also being received within a recess formed in the valve element. The pin conveniently includes a central region of diameter greater than the width of the recess. Such an arrangement is advantageous in that the pin is held captive and so the backlash free connection will not be broken by, for example, vibrations.

The valve may be of the type of the first aspect of the invention.

The invention will further be described, by way of example, with reference to the accompanying drawings, in which:

FIG. 2 is an enlargement of part of FIG. 1;

FIG. 3 is a diagram illustrating part of the valve in another plane; and

Figure 1:
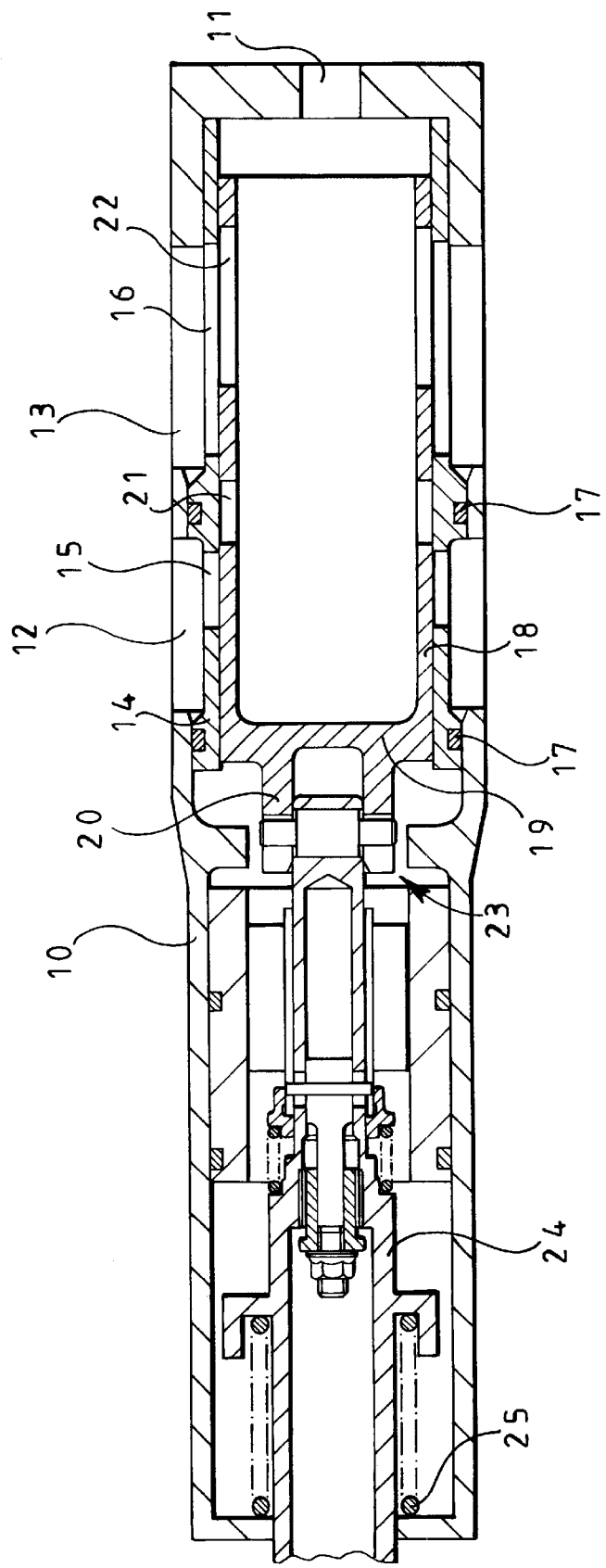
FIG. 1 is a sectional view of part of a fluid metering valve in accordance with an embodiment of the invention.

The valve illustrated in the accompanying drawings comprises a housing 10 having, at one end, an axial inlet port 11 and two spaced outlet ports 12, 13 in the form of openings. A sleeve 14 is located within the housing 10, the sleeve 14 being provided with openings 15, 16 which open into respective ones of the ports 12, 13. Seals in the form of O-rings 17 are provided between the sleeve 14 and the housing 10 to form a substantially fluid tight seal therebetween.

Figure 4:
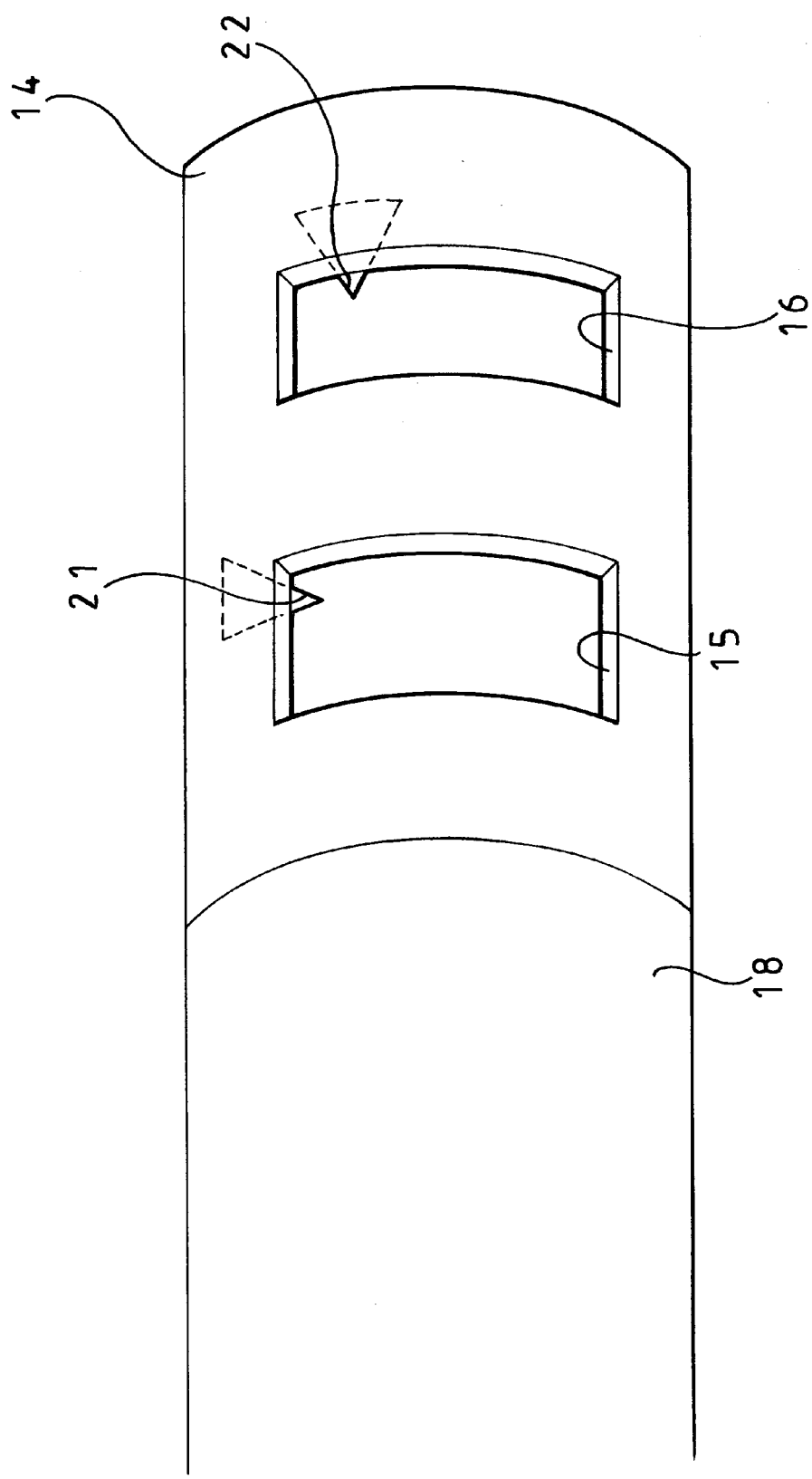
FIG. 4 is a diagrammatic perspective view illustrating operation of the valve of FIG. 1.

Slidable within the sleeve 14 is a valve element 18. The valve element 18 includes a region of tubular form of outer diameter substantially equal to the inner diameter of the sleeve 14, forming a substantially fluid tight seal therewith. The part of the valve element 18 of tubular form is closed, at the end thereof remote from the inlet port 11, by an inwardly extending flange 19 from which a tubular projection 20 extends. The valve element 18 is provided with openings 21, 22 which are arranged to cooperate with the openings 15, 16 respectively to control the rate at which fluid is able to flow from the inlet port 11 to the outlet ports 12, 13. The openings 21, 22 and the openings 15, 16 are shaped such that the rate at which fluid is delivered through the first outlet port 12 can be controlled independently of the rate at which fluid is delivered through the second outlet port 13. This may be achieved, for example, by providing the sleeve 14 with openings which cooperate with, for example, triangular openings provided in the valve element 18 as illustrated in FIG. 4. In such an arrangement, the rate at which fluid is delivered through the first outlet port 12 is controlled by controlling the angular position of the valve element 18 to control the area of the opening 21 which overlies the opening 15 provided in the sleeve 14. It will be appreciated that, in such an arrangement, angular movement of the valve element 18 varies the rate at which fluid is delivered through the first outlet port 12, but does not have an effect upon the rate at which fluid is delivered through the second outlet port 13 as the area of the part of the opening 22 which overlies the opening 16 does not change upon angular movement of the valve element 18. The rate at which fluid is delivered through the second outlet port 13 is controlled by controlling the axial position of the valve element 18. Axial movement of the valve element 18 adjusts the area of the opening 22 which overlies the opening 16 to adjust the rate at which fluid is delivered through the second outlet port 13, such movement having no effect upon the area of the opening 21 which overlies the opening 15, and hence has no effect upon the rate of fluid delivery through the first outlet port 12. It will be appreciated that a change in the inlet flow rate will be required to compensate for changes in the outlet flow rates through the first and second outlet ports 12, 13.

Although as described hereinbefore, angular movement of the valve element 18 adjusts the fluid flow rate through the first outlet port 12 and axial movement adjusts the fluid flow rate through the second outlet port 13, arrangements are possible in which angular or axial movement of the valve element 18 may cause the fluid flow rate through both of the outlet ports to change. In such arrangements, by appropriate control of movement of the valve element, the fluid flow rates through the first and second outlet ports can still be controlled independently of one another.

In order to control the axial and angular positions of the valve element 18, the valve element 18 is coupled through a backlash free connection 23 to a drive shaft 24. The axial and angular positions of the drive shaft 24 are controlled using any suitable technique, for example using a stepper motor, to adjust the angular and axial positions thereof. In adjusting the axial position, the drive shaft 24 is moveable against the action of a spring 25. Although in the embodiment illustrated, the spring 25 is provided within the housing 10, arrangements are possible in which the spring 25 is located externally of the housing 10, or indeed in which an alternative technique is used to bias the drive shaft 24. The biasing of the position of the drive shaft 24 urges the drive shaft 24 towards the valve element 18. Similarly, the fluid under pressure applied to the inlet port 11 applies a biasing force to the valve element 18 urging the valve element 18 towards the drive shaft 24.

As shown most clearly in FIGS. 2 and 3, the backlash free connection 23 between the drive shaft 24 and the valve element 18 takes the form of a load transmitting pin 26 which is located within a transverse bore or drilling provided in the drive shaft 24. The pin 26 includes a central region of relatively large diameter and end regions of smaller diameter which project from the drive shaft 24 and which are received within V-shaped recesses 27 provided in the tubular projection 20 of the valve element 18. The shape of the V-shaped recesses 27 and diameter of the parts of the pin 26 which project from the drive shaft 24 are chosen such that the pin 26 is spaced from the narrower end of the V-shaped recesses 27, the biasing force of the spring 25 and fluid under pressure supplied to the inlet port 11 holding the valve element 18 in this position relative to the drive shaft 24, substantially preventing axial and angular movement therebetween. It will be appreciated that were the pin 26 to be located at the base of the recess 27, then although axial movement of the valve element relative to the drive shaft 24 may be prevented, a small amount of relative angular movement may be permitted therebetween as the pin 26 moves into and out of engagement with the sides of the recesses, thus accurate control of the angular position of the valve element 18 may not be possible. Indeed, depending upon the shape of the recesses, relative axial movement may also occur.

The nature of the backlash free connection 23 is such that the pin 26 is unable to escape from the drilling or bore provided in the drive shaft 24, the pin 26 being held in position by the tubular projection 20, the recesses 27 provided therein being of sufficiently small width that the relatively large diameter central region of the pin 26 is unable to pass therethrough, thus movement of the pin 26 out of engagement with the drive shaft 24, for example as a result of vibrations, is not permitted.

The recesses 27 need not be V-shaped, but should be of any suitable shape which allows the transmission of axial and angular loads whilst substantially preventing relative axial and angular movement between the drive shaft and the valve element.

In addition to providing a backlash free connection between the drive shaft 24 and the valve element 18, it is desirable to be able to monitor the position of the drive shaft 24, hence providing an indication of the axial and angular position of the valve element 18, and to provide an arrangement in which an appropriate datum position for the sensor can be selected. As illustrated most clearly in FIG. 2, the sensor used to monitor the axial and angular positions of the valve element 18 comprises a sensor body 28 located within the housing 10 which monitors the position of a target 29 carried by a tubular sleeve 30 which, in use, is moveable with the drive shaft 24. The sleeve 30 is coupled through a pin 31 to a carrier 32 which is used to adjust the axial position of the sleeve 30, and hence the axial position of the target 29 relative to the drive shaft 24 to permit selection of a datum axial position. The pin 31 is a close clearance fit with openings formed in the sleeve 30 and in the carrier 32, the pin 31 passing through a slot formed in the drive shaft 24, the carrier 32 being located within a stepped bore 24a formed in the drive shaft 24.

The carrier 32 includes a stem region which is of non circular cross-section, for example hexagonal cross-section, and which is received within a similarly shaped opening formed in a self-locking angular adjustment member 33, keying the carrier to the angular adjustment member. The angular adjustment member 33 is externally screw-threaded, and engages with similar screw-threads formed in the wall defining the bore 24a. It will be appreciated that angular movement of the angular adjustment member 33 relative to the drive shaft 24 is transmitted to the sleeve 30 and target 29 through the stem region of the carrier 32 which is of, for example, hexagonal cross-section.

In order to permit adjustment of the axial position of the carrier 32 relative to the angular adjustment member 33, the carrier 32 is externally screw-threaded at an end region thereof which extends from the angular adjustment member 33, and an axial adjustment member in the form of a self-locking nut 34 or other screw threaded member is secured to the carrier 32.

A spring 35 is provided between the drive shaft 24 and a collar 36 which abuts an end of the tubular sleeve 30, the collar 36 extending to a position which covers part of an end region of the pin 31 such that movement of the pin 31 out of engagement with the tubular sleeve 30 and carrier 32 is not permitted.

In use, in order to set the datum positions for the sensor, the valve element 18 is moved to a desired datum position. Once this position has been reached, the angular adjustment member 33 is moved angularly relative to the drive shaft 24 until the target 29 has reached the desired datum angular position. Once the desired datum angular position has been achieved, the nut 34 is rotated relative to the carrier 32 to adjust the axial position of the carrier 32 relative to the angular adjustment member 33, and hence the drive shaft 24. The spring force applied by the spring 35 through the collar 36 to the tubular sleeve 30 urges the nut 34 into engagement with the angular adjustment member 33, thus the angular movement of the nut 34 causes axial movement of the carrier 32, and hence the target member 29, movement continuing until the desired axial datum position for the target member 29 has been achieved.

It is important to ensure that the angular datum position is set before the axial datum position as adjustment of the angular datum position results in slight adjustment of the axial datum position due to the screw threaded coupling between the angular adjustment member and the drive shaft.

In addition to biasing the nut 34 into engagement with the angular adjustment member 33, the spring 35 serves to reduce the risk of the axial and angular adjustment members moving, in use, relative to the drive shaft 24, thus forming a substantially backlash free mounting for the target 29 upon the drive shaft 24.

It will be appreciated that the backlash free connection between the drive shaft 24 and the valve element 18 may be modified whilst remaining within the scope of the invention. For example, the pin 26 may be of substantially uniform diameter. Alternatively, the pin 26 may be omitted, and instead the drive shaft 24 provided with integral outwardly extending projections arranged to be received within the recesses 27. In a further alternative embodiment, the pin 26 could be received within recesses formed within the drive shaft 24. In such arrangements, the pin 26 may either cooperate within recesses formed in the valve element 18 or may extend through openings formed within the valve element 18.

It will further be appreciated that the backlash free connection between the drive shaft and the valve element and the mounting of the target may be used independently of one another.

What is claimed is:

1. A fluid metering valve comprising a valve element moveable, axially and angularly, by a drive member, a sensor arranged to monitor the position occupied by a target carried by the drive member, and an adjustment arrangement whereby the axial position of the target can be adjusted relative to the drive member independently of the angular position of the target.

2. A valve as claimed in claim 1, wherein the target is carried by a carrier member which is keyed to an angular adjustment member, the angular adjustment member being angularly adjustable relative to the drive member.

3. A valve as claimed in claim 2, wherein the angular adjustment member is in screw threaded engagement with the drive member.

4. A valve as claimed in claim 2, wherein the carrier member is slidable axially relative to the angular adjustment member, and axial adjustment means are provided to permit adjustment of the axial position of the carrier member relative to the angular adjustment member.

5. A valve as claimed in claim 2, wherein the carrier member takes the form of a tubular sleeve.

6. A valve as claimed in claim 1, wherein a spring is provided between the drive member and the target such that the mounting of the target to the drive member is substantially backlash free.

7. A valve as claimed in claim 1, wherein the valve has two outlet ports, and wherein the fluid flow rates to the two outlet ports can be controlled independently of one another by appropriate control of the angular and axial position of the valve element.

8. A valve as claimed in claim 1, further comprising a backlash free connection between the valve element and the drive member, the backlash free connection comprising a projection protruding laterally from one of the drive member and the valve element, the projection being received within a recess having a base, the recess being associated with the other of the drive member and the valve element, the dimensions of the projection and the recess being such that the projection engages the sides of the recess but is spaced from the base thereof, and biasing means urging the projection towards the base of the recess.

9. A fluid metering valve comprising a valve element which is moveable axially and angularly, a drive member whereby axial and angular movements are transmitted to the valve element, and a backlash free connection between the valve element and the drive member, the backlash free connection comprising a projection protruding laterally from one of the drive member and the valve element, the projection being received within a recess having a base, the recess being associated with the other of the drive member and the valve element, the dimensions of the projection and the recess being such that the projection engages the sides of the recess but is spaced from the base thereof, and a biasing arrangement urging the projection towards the base of the recess.

10. A valve as claimed in claim 9, wherein the projection is defined by an end region of a pin.

11. A valve as claimed in claim 10, wherein the pin extends through an opening formed in the drive member, an end region of the pin engaging with a recess formed in the valve element, an opposite end region of the pin also being received within a recess formed in the valve element.

12. A valve as claimed in claim 11, wherein the pin includes a central region of diameter greater than the width of the recess.

13. A valve as claimed in claim 9, wherein the recess is of V-shaped form.

\* \* \* \* \*